(12) United States Patent
Li et al.

(10) Patent No.: US 11,750,301 B1
(45) Date of Patent: Sep. 5, 2023

(54) CERAMIC PIEZOELECTRIC UNDERWATER DETECTION AND 5TH GENERATION MOBILE PHONE ANTENNA

(71) Applicant: Anhui University, Hefei (CN)

(72) Inventors: Yingsong Li, Hefei (CN); Lulu Meng, Hefei (CN); Zhixiang Huang, Hefei (CN)

(73) Assignee: ANHUI UNIVERSITY, Hefei (CN)

( * ) Notice: Subject to any disclaimer, the term of this patent is extended or adjusted under 35 U.S.C. 154(b) by 0 days.

(21) Appl. No.: 18/303,673

(22) Filed: Apr. 20, 2023

(30) Foreign Application Priority Data

Sep. 22, 2022 (CN) .......................... 202211159749.1

(51) Int. Cl.
| | | |
|---|---|---|
| *H01Q 1/24* | (2006.01) | |
| *H01Q 1/38* | (2006.01) | |
| *H04B 13/02* | (2006.01) | |
| *H01Q 1/00* | (2006.01) | |

(52) U.S. Cl.
CPC ............. *H04B 13/02* (2013.01); *H01Q 1/002* (2013.01); *H01Q 1/241* (2013.01)

(58) Field of Classification Search
CPC .. H01Q 1/38; H01Q 1/04; H01Q 1/00; H01Q 1/002; H01Q 1/24; H04B 13/02; H03H 9/17; H03H 9/70; H03H 9/72
See application file for complete search history.

(56) References Cited

U.S. PATENT DOCUMENTS

| | | | | |
|---|---|---|---|---|
| 4,187,489 A | * | 2/1980 | Silberg ................... | H04B 13/02 340/852 |
| 6,456,172 B1 | | 9/2002 | Ishizaki | |
| 7,683,837 B2 | * | 3/2010 | Noro ..................... | H01Q 1/3233 343/702 |
| 9,374,059 B1 | * | 6/2016 | Hurwitz .................. | H03H 3/02 |
| 11,472,524 B2 | * | 10/2022 | Sastre-Cordova ...... | B63C 11/26 |
| 11,678,112 B2 | * | 6/2023 | Ghaffarivardavagh ...... H04R 17/10 367/157 |  |
| 2013/0314173 A1 | | 11/2013 | Inoue | |
| 2021/0184645 A1 | | 6/2021 | Luo | |

FOREIGN PATENT DOCUMENTS

| | | |
|---|---|---|
| CN | 1523754 A | 8/2004 |
| CN | 104617395 A | 5/2015 |
| CN | 108155831 A | 6/2018 |
| CN | 208001241 A | 10/2018 |
| CN | 109056068 A | 12/2018 |
| CN | 109088601 A | 12/2018 |
| CN | 109225789 A | 1/2019 |
| CN | 110911809 A | 3/2020 |
| CN | 111811638 A | 10/2020 |
| CN | 112039464 A | 12/2020 |
| CN | 114499552 A | 5/2022 |

\* cited by examiner

*Primary Examiner* — Tho G Phan

(57) ABSTRACT

Disclosed is a ceramic piezoelectric underwater detection and 5th generation (5G) mobile phone antenna, including: a ceramic cavity, a thin film, electrode feed holes and a coating, where the thin film is embedded inside the ceramic cavity; the electrode feed holes are drilled on both sides of the thin film at one end of a bottom of the ceramic cavity; the coating is coated outside the ceramic cavity for realizing omnidirectional radiation; the thin film drives the ceramic cavity to make the coating on an outer surface of the ceramic cavity generate radiation vibrations and generate electromagnetic wave radiation for communication and underwater detection.

5 Claims, 3 Drawing Sheets

CERAMIC PIEZOELECTRIC UNDERWATER DETECTION AND 5TH GENERATION MOBILE PHONE ANTENNA

CROSS-REFERENCE TO RELATED APPLICATIONS

This application claims priority to Chinese Patent Application No. 202211159749.1, filed on Sep. 22, 2022, the contents of which are hereby incorporated by reference.

TECHNICAL FIELD

The application belongs to the fields of underwater communication, underwater positioning and underwater detection, and in particular to a ceramic piezoelectric underwater detection and 5th generation (5G) mobile phone antenna.

BACKGROUND

With the development of people's cognition and the increasing demand of life, there are more and more activities to explore the ocean. The conventional underwater detection mainly relies on underwater acoustic detection, but in recent years, underwater detection technology has developed from underwater acoustic communication and detection to non-acoustic communication and detection, providing diversified communication and detection services for underwater or ocean.

In addition, it is difficult for underwater acoustic communication and detection technology to get out of the water while it is necessary for conventional wireless communication technology to design an antenna according to the relationship between the frequency and wavelength of electromagnetic waves in order to realize low-frequency communication. Therefore, it is necessary to design a low-frequency antenna in low-frequency or even underwater communication. However, according to the antenna design principle, the antenna stretches for tens to hundreds of kilometers, which makes it difficult to carry it by underwater mobile equipment.

SUMMARY

In order to solve the above problems, the application provides a ceramic piezoelectric underwater detection and 5th generation (5G) mobile phone antenna to design an antenna from low frequency to 6 gigahertz (GHz) through a design of lead zirconate titanate thin film and rare earth-iron alloy coating, and a size of the antenna is one thousandth to one tenth of that of the conventional antenna, and the antenna may be used in underwater communication, detection, 4G, 5G and other mobile terminals.

In order to achieve the above purpose, the application provides the following scheme: a ceramic piezoelectric underwater detection and 5G mobile phone antenna, including:

a ceramic cavity, a thin film, electrode feed holes and a coating.

The thin film is embedded in the ceramic cavity.

The electrode feed holes are drilled on both sides of the thin film at one end of a bottom of the ceramic cavity.

The coating is coated outside the ceramic cavity for realizing omnidirectional radiation.

The thin film drives the ceramic cavity to make the coating on the outer surface of the ceramic cavity generate radiation vibrations and generate electromagnetic wave radiation for communication and detection.

Optionally, a positive electrode and a negative electrode are further included inside the ceramic cavity.

The positive electrode and the negative electrode are respectively arranged on both sides of the thin film and adhered to the ceramic cavity and the thin film.

Optionally, the electrode feed holes include a positive electrode feed hole and a negative electrode feed hole.

One end of the positive electrode adjacent to the positive electrode feed hole is provided with a positive electrode feed point.

One end of the negative electrode adjacent to the negative electrode feed hole is provided with a negative electrode feed point.

Optionally, the positive electrode is connected with the positive electrode feed hole through the positive electrode feed point.

The negative electrode is connected with the negative electrode feed hole through the negative electrode feed point.

Optionally, the thin film includes a lead zirconate titanate thin film.

Optionally, the coating includes a rare earth-iron alloy coating.

Optionally, a size of the thin film, power supply voltages of the positive electrode and the negative electrode, and positions of the positive electrode feed hole and the negative electrode feed hole may be adjusted according to actual requirements, so as to design an antenna from low frequency to 6 gigahertz (GHz).

Optionally, the ceramic cavity, the thin film, the positive and negative electrodes at least include a circular ceramic cavity, a circular thin film, circular ring-shaped positive and negative electrodes, and a rectangular ceramic cavity, a rectangular thin film, rectangular ring-shaped positive and negative electrodes.

The application discloses the following technical effects.

The ceramic piezoelectric underwater detection and 5G mobile phone antenna provided by the application adopt the ceramic cavity, which avoids the erosion of water and seawater; the lead zirconate titanate thin film is adopted to generate resonance from low frequency to 6 GHz; the design of different resonance frequencies is realized by changing the size of the lead zirconate titanate thin film and the power supply voltages of the positive electrode and the negative electrode; and the rare earth-iron alloy coating provides good radiation characteristics, so radiation from low frequency to 6 GHz is realized. Moreover, the ceramic piezoelectric underwater detection and 5G mobile phone antenna has extremely small antenna size, with one thousandth to one tenth of that of the conventional antenna, is able to realize directly underwater to air communication, is able to be applied in underwater communication, detection, 4G, 5G and other mobile terminals, and has broad application prospects.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application, which may be obtained by ordinary people in the field without creative work.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

In order to make the above objectives, features and advantages of the present application more obvious and easier to understand, the present application will be further described in detail with the attached drawings and specific embodiments.

Figure 1:
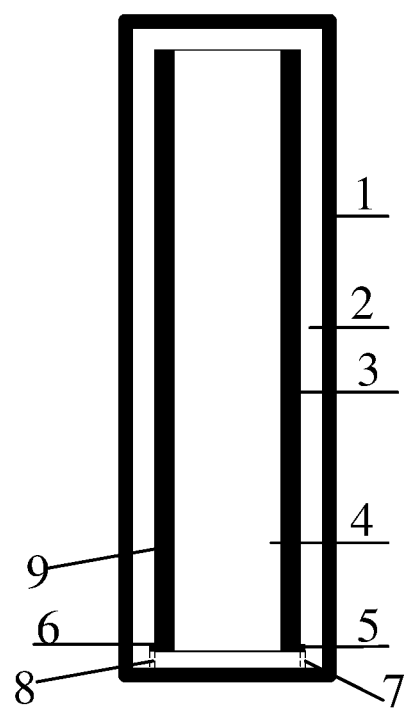
FIG. 1 is a cross-sectional view of a ceramic piezoelectric underwater detection and 5th generation (5G) mobile phone antenna of the present application.

As shown in FIG. 1, the present application provides a ceramic piezoelectric underwater detection and 5th generation (5G) mobile phone antenna. The ceramic piezoelectric underwater detection and 5th generation (5G) mobile phone antenna includes a ceramic cavity, a lead zirconate titanate thin film inside the ceramic cavity, a positive electrode feed hole, a negative electrode feed hole, a rare earth-iron alloy coating, positive and negative electrode electrodes. The lead zirconate titanate thin film is embedded inside the rectangular ceramic cavity and the positive electrode feed hole and the negative electrode feed hole are respectively drilled on both sides of the lead zirconate titanate thin film at one end of a bottom of the rectangular ceramic cavity. The positive electrode feed hole and the negative electrode feed hole are respectively connected to the positive electrode and the negative electrode. Positive and negative electrodes of a direct voltage are respectively applied to the positive and negative electrodes on both sides of the lead zirconate titanate thin film, and the positive and negative electrodes are tightly adhered to the rectangular ceramic cavity. The rare earth-iron alloy coating is coated outside the rectangular ceramic cavity to realize omnidirectional radiation. The lead zirconate titanate thin film inside the ceramic cavity drives the ceramic cavity to make the rare earth-iron alloy coating on the outer surface of the ceramic cavity generate vibration and electromagnetic wave radiation.

The antenna is able to generate extremely low operation frequency, and a size of the lead zirconate titanate thin film, power supply voltages of the positive electrode and the negative electrode, and positions of the positive electrode feed hole and the negative electrode feed hole may be adjusted according to requirements, thereby designing the antenna from low frequency to 6 GHz. The antenna supplies power with a direct current power supply, is designed as ultraminiaturized low-frequency antenna and may be applied in underwater communication, detection, 4G, 5G and other mobile terminals.

Embodiment 1

Figure 2:
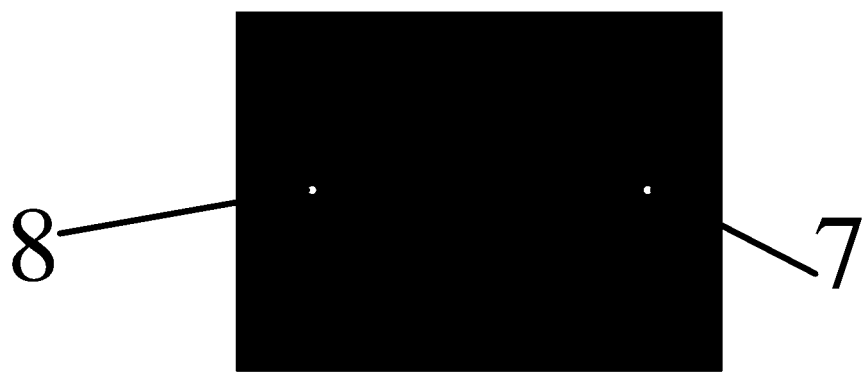
FIG. 2 is a schematic diagram of a bottom of a ceramic piezoelectric underwater detection and 5G mobile phone antenna of the present application.
Figure 3:
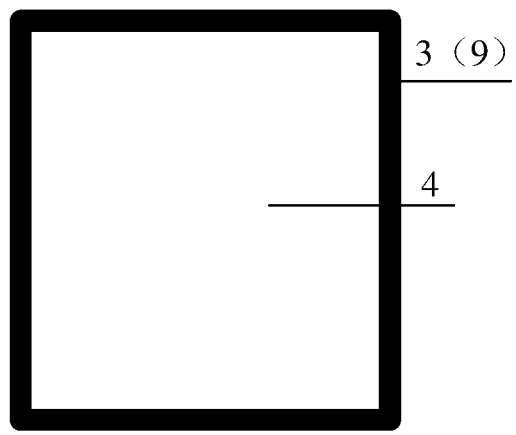
FIG. 3 is a schematic diagram of a connection of electrodes inside a ceramic piezoelectric underwater detection and 5G mobile phone antenna.

As shown in FIG. 1 to FIG. 3, the lead zirconate titanate thin film 4 is embedded inside the ceramic cavity 2, and left and right sides of the lead zirconate titanate thin film 4 are metal layers of the positive electrode 3 and the negative electrode 9, respectively. The direct current voltage source is respectively connected with the positive electrode feed point 5 and the negative electrode feed point 6 through the positive electrode feed hole 7 and the negative electrode feed hole 8 at the bottom of the ceramic cavity 2, and the positive electrode feed point 5 and the negative electrode feed point 6 are respectively connected with the metal layers of the positive electrode 3 and the negative electrode 9; and positive and negative electrode metal layers are arranged between the lead zirconate titanate thin film 4 and the ceramic cavity 2, and the metal layers of the positive electrode 3 and the negative electrode 9 are closely adhered to the lead zirconate titanate thin film 4 and the inside of the ceramic cavity 2. The structure composed of the lead zirconate titanate thin film 4, the positive electrode 3 and the negative electrode 9 fills the whole ceramic cavity 2. An outside of the ceramic cavity 2 is completely wrapped by the rare earth-iron alloy coating 1.

The antenna is able to work at extremely low frequency, and through adjusting the size of the lead zirconate titanate thin film, the power supply voltages of the positive electrode and the negative electrode, and the positions of the positive electrode feed hole and the negative electrode feed hole, different excitations are realized, and through adjusting working modes of the lead zirconate titanate thin film, the antenna from low frequency to 6 GHz is designed.

According to the present application, the ceramic cavity, the lead zirconate titanate thin film, the positive and negative electrodes may be a circular ceramic cavity, a circular lead zirconate titanate thin film, circular ring-shaped positive and negative electrodes, respectively; the ceramic cavity, the lead zirconate titanate thin film, the positive and negative electrodes may also be a rectangular ceramic cavity, a rectangular lead zirconate titanate thin film, rectangular ring-shaped positive and negative electrodes, respectively, and may adopt other shapes. Moreover, the ceramic cavity, the lead zirconate titanate thin film, the positive and negative electrodes may be designed according to requirements and practical applications.

The lead zirconate titanate thin film may be designed according to the application occasion and the actual operation frequency band, and a size and a thickness of the lead zirconate titanate thin film are designed according to the operation frequency, voltage and the overall structure of the ceramic cavity, so as to realize the operation frequency from low frequency to 6 GHz.

In order to achieve better radiation, the application makes use of the advantages of domestic rare earth industry, and uses rare earth and titanium alloy to realize the coating of the rare earth-iron alloy coating on the outside of the ceramic cavity, so as to achieve good omnidirectional radiation of the antenna from low frequency to 6 GHz.

The ceramic piezoelectric underwater detection and 5G mobile phone antenna designed by the application is able to work in frequency bands from low frequency to 6 GHz, is ultraminiaturized, has adjustable and controllable operation frequency, and may be applied to underwater communication, detection, 2G, 3G, 4G and 5G and mobile phone terminals, and has a good application prospect.

The above-mentioned embodiments only describe the preferred mode of the application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A ceramic piezoelectric underwater detection and 5G mobile phone antenna, comprising:
   a ceramic cavity, a thin film, electrode feed holes and a coating,
   wherein the thin film is embedded inside the ceramic cavity;
   the electrode feed holes are drilled on both sides of the thin film at one end of a bottom of the ceramic cavity;
   the coating is coated outside the ceramic cavity for realizing omnidirectional radiation;
   the thin film drives the ceramic cavity to make the coating on an outer surface of the ceramic cavity generate radiation vibrations and generate electromagnetic wave radiation for communication and underwater detection; and
   the thin film comprises a lead zirconate titanate thin film, and the coating comprises a rare earth-iron alloy coating.

2. The ceramic piezoelectric underwater detection and 5G mobile phone antenna according to claim 1, wherein a positive electrode and a negative electrode are further comprised inside the ceramic cavity;
   the positive electrode and the negative electrode are respectively arranged on both sides of the thin film and adhered to the ceramic cavity and the thin film.

3. The ceramic piezoelectric underwater detection and 5G mobile phone antenna according to claim 2, wherein the electrode feed holes comprise a positive electrode feed hole and a negative electrode feed hole;
   one end of the positive electrode adjacent to the positive electrode feed hole is provided with a positive electrode feed point; and
   one end of the negative electrode adjacent to the negative electrode feed hole is provided with a negative electrode feed point.

4. The ceramic piezoelectric underwater detection and 5G mobile phone antenna according to claim 3, wherein the positive electrode is connected with the positive electrode feed hole through the positive electrode feed point, and
   the negative electrode is connected with the negative electrode feed hole through the negative electrode feed point.

5. The ceramic piezoelectric underwater detection and 5G mobile phone antenna according to claim 1, wherein the ceramic cavity, the thin film, positive and negative electrodes at least comprise a circular ceramic cavity, a circular thin film, and circular ring-shaped positive and negative electrodes; and a rectangular ceramic cavity, a rectangular thin film, rectangular ring-shaped positive and negative electrodes.

\* \* \* \* \*